Patented Sept. 20, 1927.

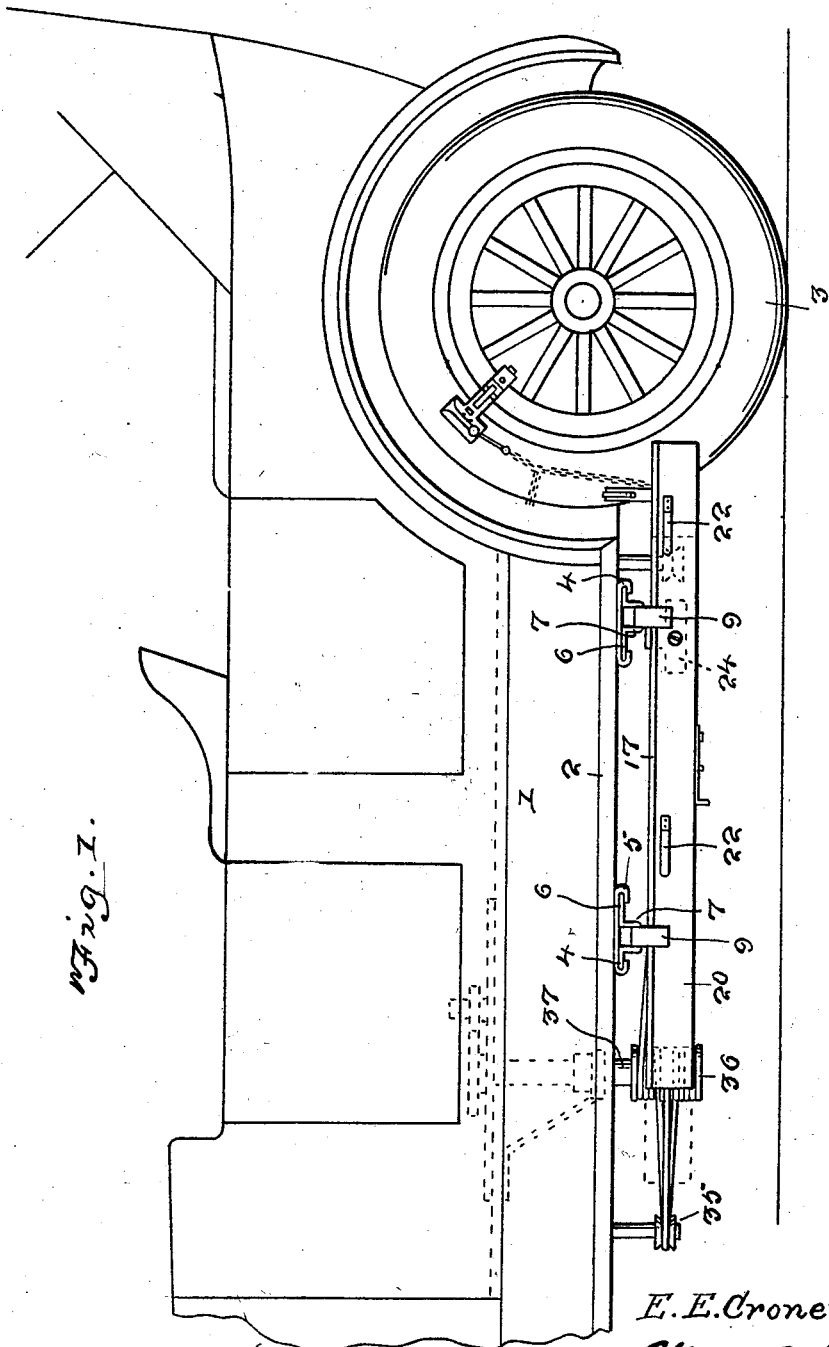

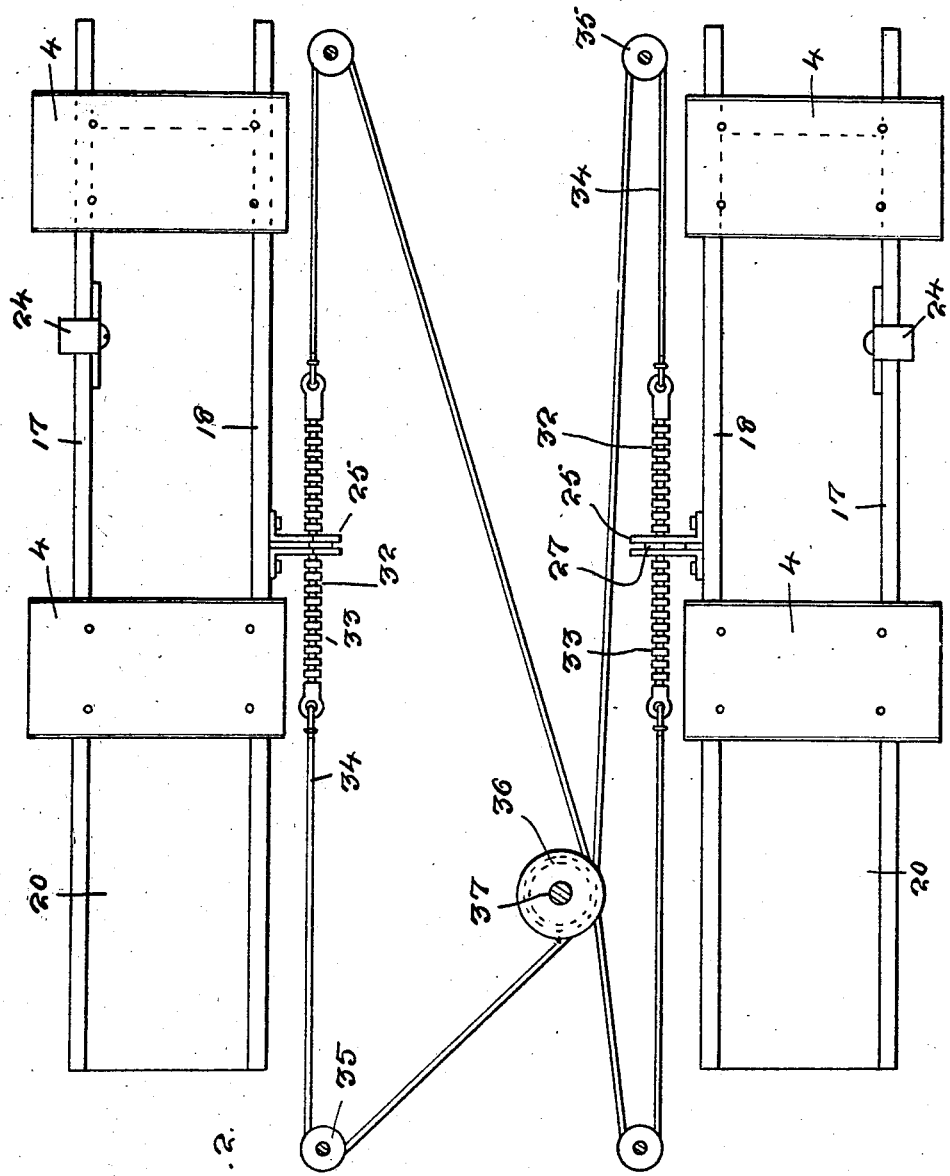

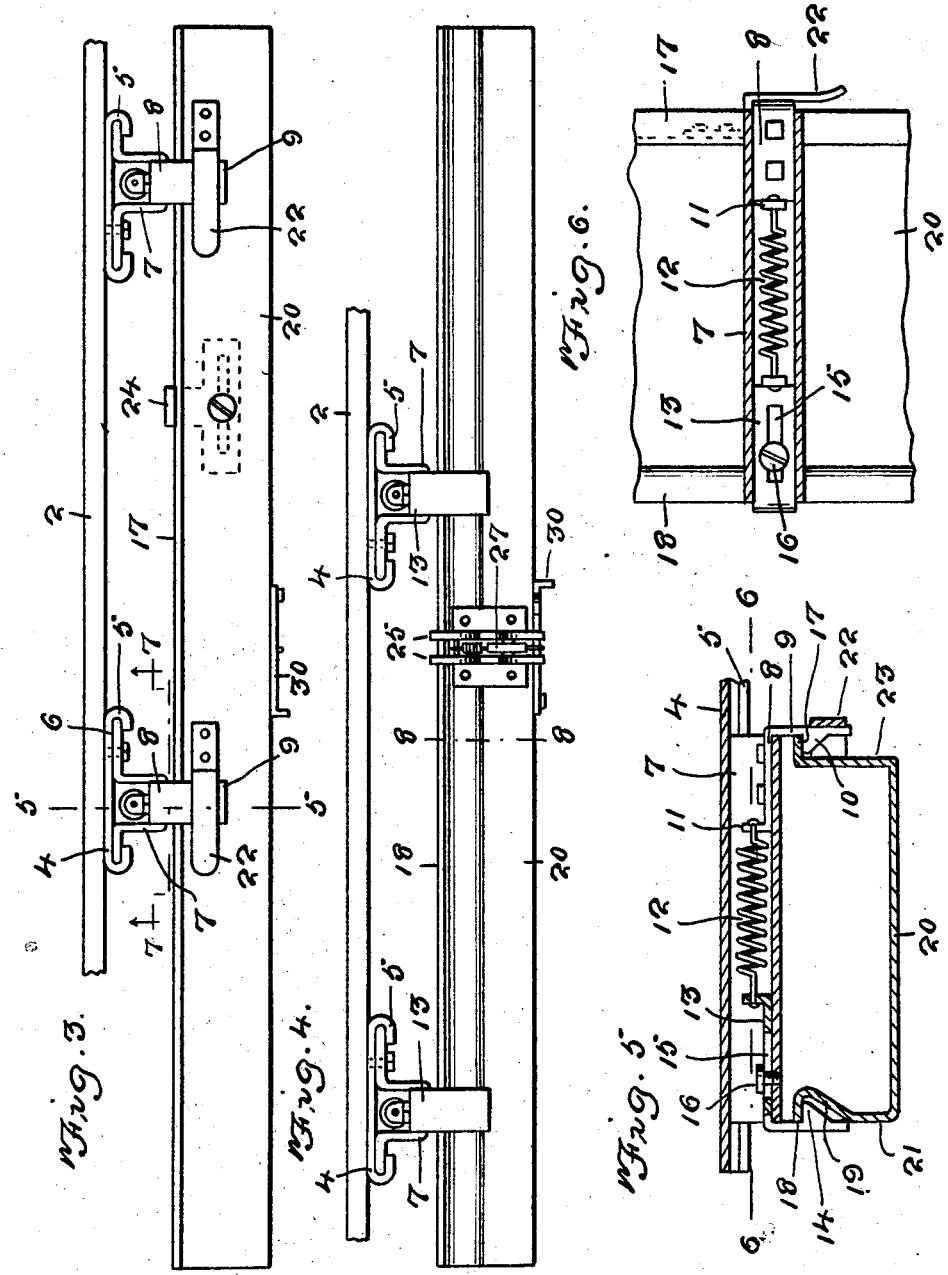

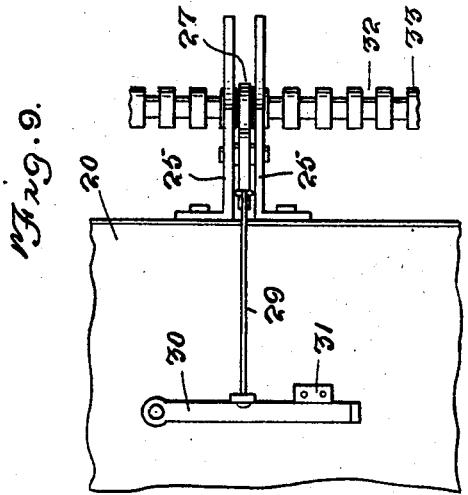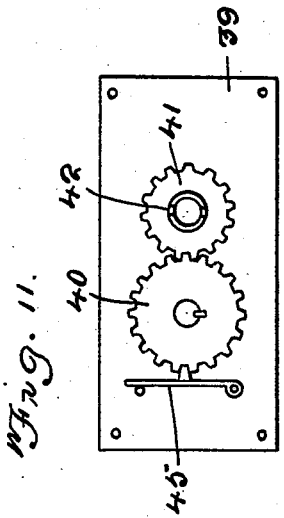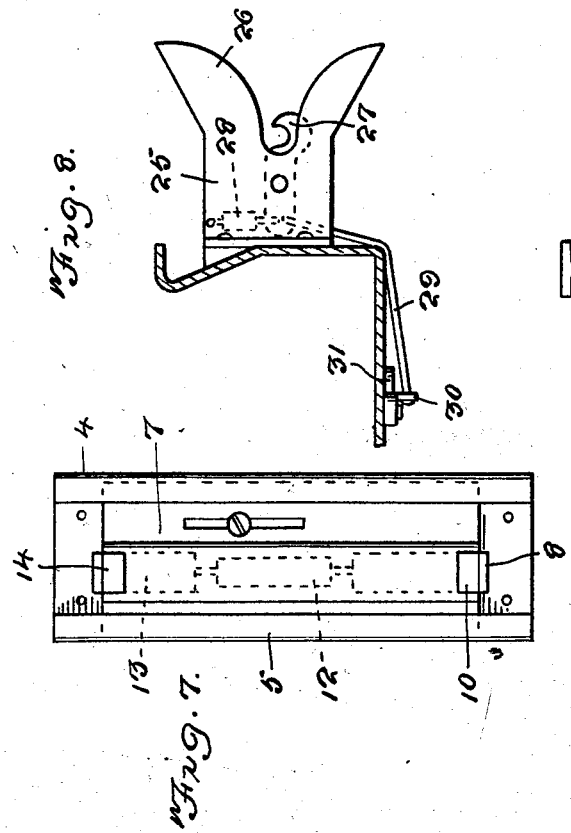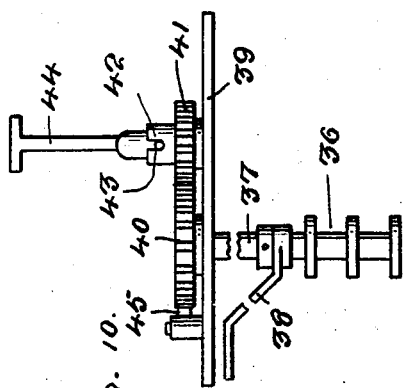

1,642,921

UNITED STATES PATENT OFFICE.

EARL E. CRONENWETH, OF GLENDALE, CALIFORNIA.

TIRE-CHAIN APPLIER.

Application filed November 18, 1926. Serial No. 149,196.

My present invention has reference to a box or container for an anti-skid chain that is movable longitudinally under the running boards of an automobile and that is designed to have arranged therein an anti-skid chain to be automatically applied to the drive wheel of the machine by the employment of means such as is disclosed in Patents Number 1,487,317, granted me on July 3, 1924, No. 1,511,657, granted me Oct. 14, 1924, No. 1,545,306, granted me July 7, 1925, and in my U. S. Patent application filed May 17, 1924, Serial No. 714,119, allowed March 20, 1926.

In my referred to patents and allowed application, specific reference is made to the means for applying the anti-skid chains to the wheels while in my present application I aim to provide a novel holding means or box for the chains and a novel means for sliding the boxes to bring the chains and the apparatus associated with the boxes to positions for the automatic application of the chains on the wheels, and further to provide a means for this purpose which may be moved only a predetermined distance so that the device may be applied to cars of various makes and models.

A further object is the provision of an anti-skid chain carrying box or housing which shall be of a simple construction, mounted under the running board of an automobile in a novel manner, and operated for longitudinal movement either toward or away from the drive wheels of the automobile from the interior of the car, said operating means being also of a simple and novel construction.

To the attainment of the foregoing and many other objects which will present themselves as the nature of the invention is better understood, the improvement resides in the construction, combination and operative association of parts, a satisfactory embodiment of which is disclosed by the drawings which accompany and form part of this application.

In the drawings:—

Figure 1 is a side elevation of a portion of an automobile provided with the improvement.

Figure 2 is a plan view of the improvement removed from the automobile, parts being in section.

Figure 3 is a side elevation of one of the chain holding boxes and the mount therefor.

Figure 4 is a view similar to Figure 3 but looking toward the opposite side thereof.

Figure 5 is a sectional view on the line 5—5 of Figure 3.

Figure 6 is a sectional view approximately on the line 6—6 of Figure 5.

Figure 7 is a sectional view on the line 7—7 of Figure 3.

Figure 8 is a sectional view approximately on the line 8—8 of Figure 4.

Figure 9 is an inverted plan view of the parts disclosed by Figure 8.

Figure 10 is a side elevation of the cable operating means.

Figure 11 is a top plan view thereof, the operating handle being removed.

As the means for holding the anti-skid chain in the longitudinally movable box and the means for automatically applying the chain to the drive wheels of an automobile are fully disclosed in my referred to patents and in my referred to allowed application, a detailed description thereof is not considered necessary and, therefore, will not be attempted.

The present invention specifically relates to the anti-skid containing boxes, the mounts therefor, and the manner in which the boxes are moved longitudinally toward the drive wheels of the vehicle and brought away therefrom when the chains have been applied.

Referring now to the drawings in detail, the numeral 1 designates any ordinary type of automobile, 2 the running board therefor and 3 the rear or drive wheels.

In carrying out my present invention I secure on the under face of the running boards 2 transversely arranged spaced channeled plates 4. Each of these plates receives between the inwardly directed ends 5 thereof, the flanges 6 of a channel member 7. On the outer face of each channel member 7 there is fixedly secured the inner straight arm 8 of an angle member whose depending arm 9 is formed with a lug 10. The member 8 has its inner end upturned, as at 11, and secured thereto there is a spring 12. The second end of the spring 12 is secured to the upset end of the arm 13 of a second angle member. The angle member has its depending arm provided with an inwardly directed lug 14. The member 13 is formed with an elongated slot 15 and receives through this slot and screwed in the channel member 7 there is the shank of a headed screw 16. The lugs 10 and 14 provide what may be properly termed guides, and these guides engage respecively with an outwardly directed flange 17 and a similar flange 18 provided in a groove 19 in the opposite sides of a cross sectionally U-shaped box 20. Of course, two of these boxes are employed and each of the boxes have arranged therein anti-skid chains and the said boxes are provided with means for moving the outer links of the chains for engagement by means on the rear wheels 3 of the automobile, as set forth in my mentioned patents and my referred to pending application.

By providing the guide lugs 10 and 14 it will be obvious that boxes 20 of varying widths may be provided.

On the upper side 21 of each of the boxes 20 there is a spaced spring slip 22, and these clips are designed to contact with the depending arms of the members 13 when the boxes are moved inwardly under the running boards in a manner as will presently be described. On the inner side 23 of each box there is an adjustable stop lug 24 designed to contact with the outer arms 9 of the members 8 when the boxes are moved longitudinally in an outward direction toward the wheels 3.

The improvement, as previously inferred, is designed for arrangement on cars of varying types and therefore of varying sizes, and to accomplish this I secure on the inner side of the oppositely disposed boxes a jaw carrying plate 25. The outer ends of each of these plates are formed with inwardly directed curved jaws 26, and movable between these jaws there is a pivotally supported catch member 27. The catch member is influenced by a spring 28 from between the jaws, but is movable in an opposite direction by a flexible element 29 connected to a lever 30 pivotally secured on the under face of each box 20 and normally engaged by a stop element 31. There is designed to be received between the jaws and to be engaged by the catch any one of a plurality of notched portions 32 in a rod or bar 33. Each rod or bar has its ends provided with eyes and to these eyes there are secured the ends of cables 34. The cables are trained around guide pulleys 35 and the free ends thereof are wound around and secured to drums 36 which are fixed on a shaft 37. The shaft is journaled, in suitable bearings 38 below the running board of the automobile, the said shaft also passing through a suitable opening either in the running board or in a plate 39. The upper end of the shaft has fixed thereon a toothed wheel 40 which meshes with a pinion 41. The hub of the pinion is notched, as at 42, and these notches are designed to receive therein lugs 43 provided on the shank of an operating handle 44. The toothed wheel 40 is normally held from turning by engagement therewith of a dog 45. By providing the notched bar it will be apparent that the boxes may be attached to the operating cables in a manner whereby said boxes will move only a predetermined longitudinal distance upon the turning of the handle 44.

It is believed that the foregoing description when taken in connection with the accompanying drawings will fully set forth the simplicity and advantages of my invention but I desire it understood that I do not wish to be restricted to the precise details of construction herein set forth and hold myself entitled to make such changes therefrom as fairly fall within the scope of what I claim.

Having described the invention, I claim:—

1. The combination with the running board of an automobile, of flanged plates secured on the under faces of the running board, a channeled member received in each of the plates, means adjustably attaching the channel members to the plates, a fixed and a spring influenced depending lug on each of the channel members, a box having flanges engaged by the lugs, and means for imparting a longitudinal movement to the boxes in either of two directions.

2. The combination with the running board of an automobile, of flanged plates secured on the under faces of the running board, a channeled member received in each of the plates, means adjustably attaching the channel members to the plates, a fixed and a spring influenced depending lug on each of the channel members, a box having flanges engaged by the lugs, means for imparting a longitudinal movement to the boxes in either of two directions, means normally holding the spring influenced lug in engagement with the side of the box and limiting the movement of the box in one direction and means on the box engageable with one of said lugs for limiting the movement of the box in the second direction.

3. In a device for the purpose set forth, the combination with the running board of an automobile, of transversely arranged spaced plates secured on the under face of said running board and said plates having inwardly directed ends, a channel member having flanges arranged on the plates, means for adjustably securing the channel members on the plates, a fixed depending lug on each channel member, a longitudinally movable spring influenced lug on the opposite side of each lug, a box having flanges which are engaged by the lugs, spring clips on one side of the box for normally engaging the spring influenced lugs, means for moving the box longitudinally in both directions and means for limiting the movement of the box in both directions.

4. In a device for the purpose set forth, in combination with an automobile and the running board thereof, of a box arranged beneath the running board, spring influenced guide means supporting the box, means limiting the longitudinal movement of the box in two directions, means for so moving the box, said means including a cable, a drum around which the cable is wound, means for operating the drum, means preventing the free turning of the drum, a notched bar associated with the cable, a jaw carrying plate on the box to receive the notched bar between the jaws thereof, a spring influenced catch movable between the jaws for engaging with a notch of the bar and lever operated means for holding the catch in such engagement.

In testimony whereof I affix my signature.

EARL E. CRONENWETH.